United States Patent

[11] 3,603,504

| [72] | Inventors | Charles Stang, Jr.;<br>Herbert J. Schlachter, both of Detroit, Mich. |
|---|---|---|
| [21] | Appl. No. | 752,599 |
| [22] | Filed | Aug. 14, 1968 |
| [45] | Patented | Sept. 7, 1971 |
| [73] | Assignee | Maxitrol Company<br>Southfield, Mich. |

[54] CONTROL FOR DIRECT GAS FIRED MAKEUP AIR HEATING
21 Claims, 6 Drawing Figs.

[52] U.S. Cl. .................................................. 236/10,
251/30, 236/84, 431/75
[51] Int. Cl. ....................................................... G05d 23/24
[50] Field of Search ........................................... 431/75,
285; 236/80, 84, 75, 78, 78 D, 10; 251/30;
137/489.5, 487.5

[56] References Cited
UNITED STATES PATENTS

| 2,376,525 | 5/1945 | Taylor | 236/10 |
| 3,056,554 | 10/1962 | Robson | 236/10 |
| 3,168,242 | 2/1965 | Diener | 236/78 X |
| 3,227,370 | 1/1966 | Houser | 236/80 X |
| 3,307,785 | 3/1967 | Currie | 236/80 |
| 3,469,590 | 9/1969 | Barker | 137/1 |
| 1,281,971 | 10/1918 | Johnson | 431/285 |
| 2,161,258 | 6/1939 | Kronmiller | 236/84 |
| 2,377,517 | 6/1945 | Ray | 236/84 |
| 3,260,459 | 7/1966 | Caparone et al. | 236/80 |
| 3,373,765 | 3/1968 | McCarty | 137/489 |

*Primary Examiner*—William E. Wayner
*Attorney*—Harness, Dickey & Pierce

ABSTRACT: A control system for use on direct-fired makeup air heating systems utilizing a pilot-operated modulating valve providing a system which is rapid in response and in which hunting is minimized.

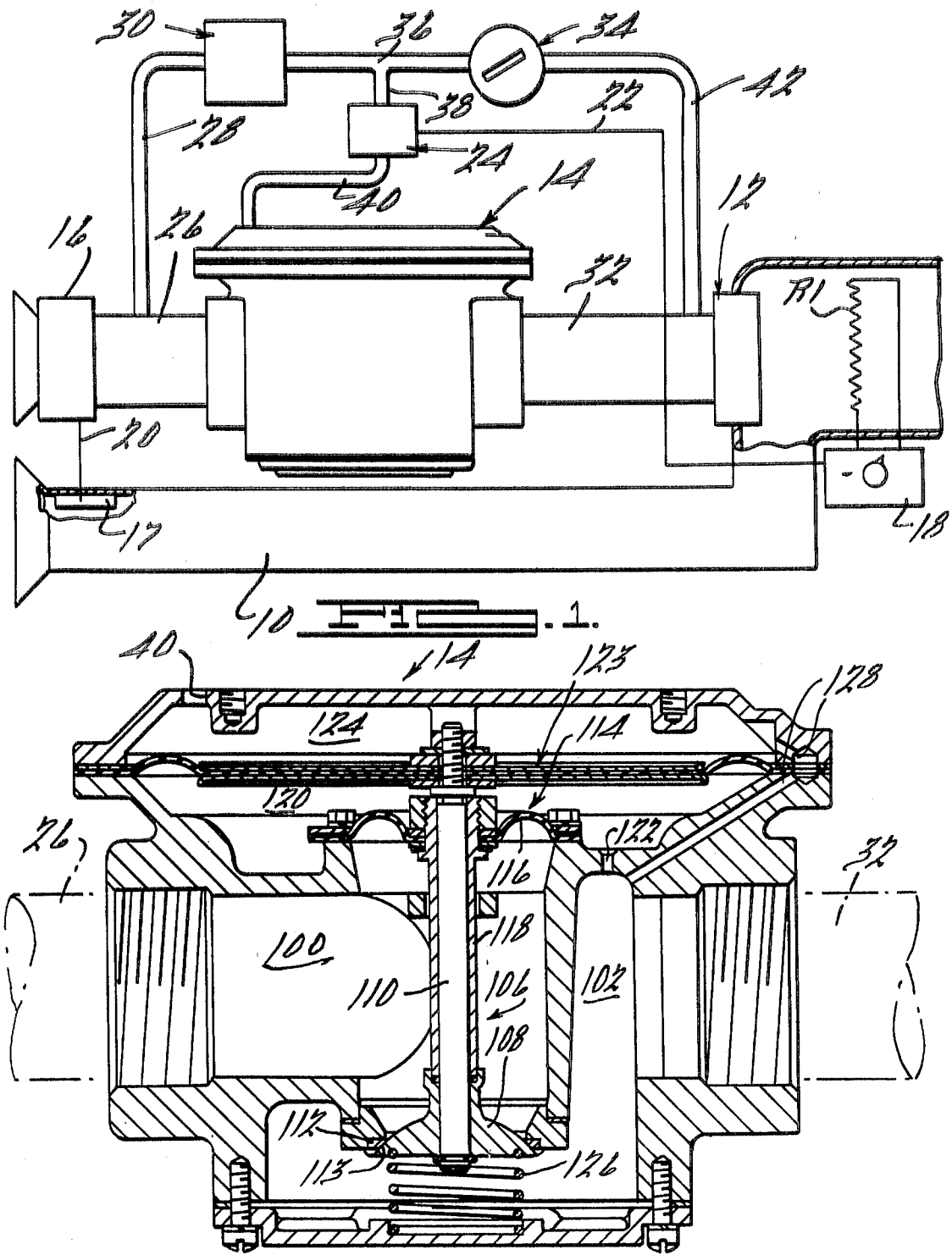

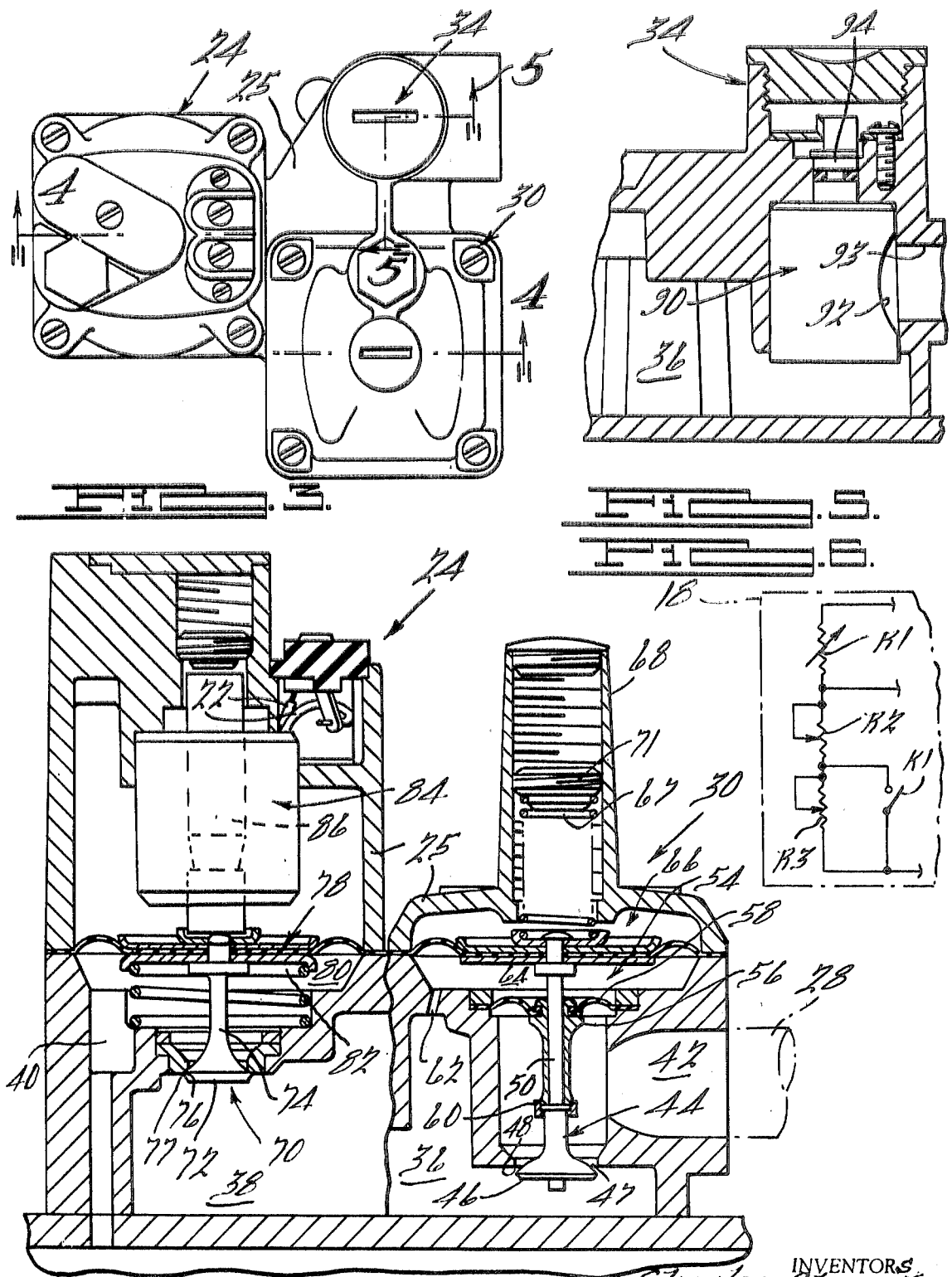

CONTROL FOR DIRECT GAS FIRED MAKEUP AIR HEATING

SUMMARY BACKGROUND OF THE INVENTION

The present invention relates to heating systems and more particularly to heating systems for heating makeup air.

In many commercial and industrial applications it is necessary that a constant supply of fresh air be introduced into the building. In many instances this quantity of air be substantial. Conventional heating systems normally provide heat for general heating of the building. Often the makeup air being brought into the building will be at a temperature substantially lower than the air within the building resulting in a cooling effect. To offset this the makeup air is heated prior to being introduced into the building whereby the demand upon the conventional heating system is lessened. In such instances the makeup air is preheated to a selected temperature with the amount of heat required to be added being a function of the temperature of the air as it is brought from the outside. In such makeup air heating systems of the past, motor control valves have been used which are generally slow in response and hence contribute to a condition of hunting or overshooting. In the system of the present invention the main gas flow through a main modulating valve is controlled by controlled gas pressure through a pilot-modulating valve; this provides a system which is rapid in response. In addition, the control gas pressure through the pilot modulating valve is well regulated whereby hunting and overshooting is minimized. Therefore, it is an object of the present invention to provide an improved control system for heating makeup air.

It is another object of the present invention to provide a novel control system for heating makeup air.

It is still another object of the present invention to provide a novel control system for heating makeup air utilizing a pilot-controlled modulating valve and providing regulated gas pressure.

In some applications it will be desirable to utilize the makeup air-heating system to operate in conjunction with the main heating system. The apparatus of the present invention readily lends itself to such combined control.

Therefore, it is another object of the present invention to provide a novel heating system for heating makeup air which readily lends itself for use in conjunction with the main heating system of a building.

Other objects, features, and advantages of the present invention will become apparent from the subsequent description and the appended claims, taken in conjunction with the accompanying drawings, in which:

FIG. 1 is a combination pictorial and diagrammatic view generally indicating the system of the present invention;

FIG. 2 is a sectional view of the main modulating valve of the present invention;

FIG. 3 is a top elevational view of the regulating valve, modulating valve and manual valve of the system of the present invention;

FIG. 4 is a sectional view to enlarged scale of the valves of FIG. 3 taken substantially along lines 4—4;

FIG. 5 is a sectional view to enlarged scale of the manual valve of FIG. 3 taken substantially along the line 5—5; and FIG. 6 is an electrical schematic diagram of a modified form of the invention.

In the diagram of FIG. 1, makeup air is introduced from the atmosphere into a building via a conduit or duct 10 which generally is in communication with a gas burner 12 whereby air from the atmosphere can be heated. The burner 12 is controlled by a main modulating valve 14 which receives gas from a supply via a main actuating valve 16. The main actuating valve 16 is controlled by a thermostatic switch 17 located at the inlet of duct 10. Switch 17 is actuated to open valve 16 via line 20 whenever the incoming air is lower in temperature than that at which switch 17 is set to be actuated. A thermistor R1 is located in the outlet of conduit 10 from burner 12 and is connected in a control circuit 18 such that when the temperature of the outgoing air in conduit 10 is less than a selected magnitude, the control circuit 18 will transmit a control signal via a conductor 22 to provide control of the modulating valve 14 whereby the amount of gas flow through the modulating valve 14 to the burner 12 will be controlled.

The main modulating valve 14 is controlled by a pilot modulating valve 24 which is connected to and responds to the magnitude of control signals from conductor 22. The pilot valve 24 is gas operated and is connected to the supply of gas via the inlet 26 to the main modulating valve 14 via a conduit 28, regulating valve 30 and to the main valve 14 via conduit 40 whereby pilot valve 24 controls or modulates main valve 14 (in a manner to be seen). An outlet line 32 from the modulating valve 14 is connected to the burner 12 whereby modulated gas flow to the burner 12 is provided.

A manually adjustable valve 34 is connected to the regulating valve 30 via the conduit 36 and to the outlet line 32 via conduit 42. The manually adjustable valve 34 provides for a minimum amount of gas flow to maintain the burner 12 on under the minimum fire condition, at which time the main modulating valve 14 is off.

In operation the control circuit 18 is manually selected to a given temperature at which it is desired that the makeup air will be introduced into the building. The thermistor R1 will provide a signal indicating the temperature of the heated makeup air. When the temperature sensed by the switch 17 is less than that at which it is set the valve 16 will be opened and gas from the main supply will be fed into the system via inlet line 26. At this time gas pressure at the inlet 26 will then be transmitted through the regulator 30 to the pilot modulating valve 24 and also to the manually adjustable valve 34. The difference in the temperature between the selected temperature of the control 18 and that sensed by the thermistor R1 will determine the magnitude of the signal transmitted to the pilot modulating valve 24 via the conductor 22. This will determine the magnitude of the control gas pressure transmitted to valve 14 via line 40 which in turn will determine the extent to which the main modulating valve 14 will be open. At the same time the gas from the inlet 26 is transmitted through regulator 30 and through the manually adjustable valve 34 to the burner 12, via the outlet 32 to ensure, as noted before, a minimum gas flow to the burner 12 when the main modulating valve 14 is in its fully modulated or closed condition. The valve 34 can be adjusted whereby the minimum flow can be selected to accommodate various systems.

The air through the conduit 10 is passed over the raw burning gas in the burner 12, i.e., no heat exchanger is utilized, and then transmitted into the building being heated; of course the system can be used for other applications using indirect heating.

Note that the pilot modulating valve 24 utilizes the main gas pressure from the main supply as the source of energy to control the main modulating valve 14. This gas pressure is well regulated via the regulator 30 whereby pilot regulator 24 can accurately control the main modulating valve 14 in accordance with variations in the magnitude of the signal from conductor 22 and will be generally unaffected by variations in gasline pressure. Hence the pilot valve 24, in controlling a small flow of gas, can control the substantial gas flow via main valve 14. As will be seen, the use of the gas pressure to control the main modulating valve 14 via the pilot valve 24 permits the use of small electrical control apparatus to control pilot valve 24. The main modulating valve 14, as controlled by the pilot modulator 24, reacts rapidly and will not tend to overshoot. The regulating valve 30, the pilot modulating valve 24 and the manually adjustable valve 34 can be constructed in a single housing assembly 25 as shown in FIGS. 3-5.

Looking now to FIGS. 3-5, the inlet conduit 26 is connected to conduit 28 which in turn is connected to an inlet chamber 42 of the regulating valve 30. The flow from the inlet chamber 42 is controlled by a poppet valve 44 which has an elongated stem 50 and a valve head 46 which coacts with a valve seat 48. The valve 44 is normally opened and the opening 47 between the head 46 and the seat 48 will determine the amount of gas flow; by appropriate control of this opening 47 regulation is provided. An outlet chamber 36 (represented by conduit 36 in FIG. 1) is in communication with the inlet chamber 42 through the passageway 47.

The stem 50 of valve 44 is connected to a valve-balancing assembly 54 which includes a hollow stem 56 connected to a diaphragm 58. Stem 56 is sealed at its lower end by a seal 60. One side of the diaphragm 58 is in communication with the pressure in the inlet chamber 42, while the opposite side of the diaphragm 58 is in communication with the outlet pressure in the chamber 36 via a fluid passageway 62 which is in communication with a sealed chamber 64 located on the opposite side of the diaphragm 58. Hence the gas pressure acting directly on the valve 44 will be balanced whereby the regulating function of the valve 30 will be affected solely by changes in pressure in cavity 36 and will not be subject to effects of valve imbalance. The valve 50 is also connected to a diaphragm assembly 66 which has one side facing the chamber 64 and hence is actuated by the outlet pressure as communicated to the chamber 64 by the passageway 62. A coil spring 67 is located in an elongated necked portion 68 of the portion of housing assembly 25 holding the regulating valve 30 and is actuable on the opposite side of the diaphragm assembly 66. The bias of spring 67 urges the valve 44 open and determines the regulated pressure at which regulator 30 will operate; the opening 47 will be varied by diaphragm assembly 66 in response to pressure variations whereby the outlet pressure at chamber 36 will be held at the selected magnitude. The bias on the spring 67 can be varied by threading a cap member 71 more or less into the necked portion 68 against the spring 67 and hence the magnitude of the pressure at which the regulator 30 will regulate can be selectively varied. Thus regulated gas pressure from the inlet line 28 will appear in the outlet chamber 36. The outlet pressure in the outlet chamber 36 is communicated to the pilot modulating valve 24 via the chamber 38 (represented by conduit 38 in FIG. 1) and is communicated to the manual valve 34 via the chamber 36.

The pilot modulating valve 24 comprises a normally closed poppet valve 70 which has a head 72 and an elongated stem 74, with the head 72 normally in engagement with an annular valve seat 76. The magnitude of the opening 77 between the valve head 72 and the valve seat 76 will determine the magnitude of the gas flow and pressure transmitted from the chamber 38 into the outlet passage 40 via chamber 80; hence, by varying the opening 77 the amount of gas flow and pressure can be modulated. The valve 70 is connected to a control diaphragm assembly 78 which has one side in communication with the chamber 80. A bias spring 82 acts on the diaphragm valve assembly 78 to normally maintain the opening 77 closed. Since the diaphragm 78 communicates with the outlet pressure in the chamber 80, regulation of the gas flow and pressure to the passageway 40 will occur whereby even closer pressure regulation to the main modulating valve 14 is provided. Note that since the gas inlet to pilot valve 24 is regulated, the valve 70 need not be balanced resulting in a simpler construction.

A solenoid 84 is connected to conductors 22 from the control circuit 18. A plunger 86 normally engages the opposite side of the diaphragm assembly 78. Upon occurrence of a signal from the control circuit 18 via the conductors 22, the solenoid 84 will be energized causing the plunger 86 to move outwardly against the diaphragm assembly 78 thereby urging the valve 70 to an open position. The position of the plunger 86 and hence the position of the valve 70 and magnitude of opening 77 will be determined by the magnitude of the signal current from control circuit 18 via conductors 22. The spring 82 is biased sufficiently to normally hold valve 70 closed and also sufficiently to keep it closed under a low fire condition (fully modulated) in which condition high air velocities across burner 12 could create a slight vacuum in chamber 80 (via the main modulating valve 14 in a manner to be described), tending to open valve 70. This latter condition can occur since the air is heated by being passed over the raw burning gas, i.e., no heat exchanger is used.

The outlet chamber 36 of regulating valve 30 is in communication with the manually adjustable valve 34. The adjustable valve includes a rotatable hollow valve member 90 which is open on the bottom for communication with chamber 36 and which has an aperture 92 in communication with the passageway 93. Since the opening 92 is circular, the valve 90 can be rotated by means of a head 94 with the amount of communication between the opening 92 and the passageway 93 being selectively varied whereby the flow through the adjustable valve 34 to the conduit 42, which is connected to passageway 93, and hence to the burner 12 can be varied. As noted, the manual valve 34 is adjusted to provide for the minimum or low fire condition of burner 12, i.e., valve 14 fully modulated.

The flow from the conduit 40 is communicated to the main modulating valve 14 (see FIGS. 1 and 2). The main modulating valve 14 has an inlet passageway 100, which is connected to the inlet conduit 26 and has an outlet passageway 102 connected to the outlet conduit 32. The flow of gas between the inlet chamber 100 and outlet chamber 102 is controlled by a poppet valve member 106 which has an enlarged head portion 108 connected to a stem 110. The head portion 108 coacts with an annular valve seat 112 such that magnitude of the opening 113 between the head 108 and seat 112 will determine the amount of gas flow from the chamber 100 to the chamber 102 whereby the flow of gas to the outlet conduit 32 can be modulated. The valve 106 is connected to a balancing assembly 114 (which is similar to the balancing assembly 54 for valve 30) which comprises an annular diaphragm 116 which is connected to an elongated sleeve 118 which in turn is connected to the stem 110 and head 108 of the valve 106. One side of the diaphragm 114 faces the inlet chamber 100 while the opposite side faces a chamber 120 which is in communication with the outlet chamber 102 via a passageway 122. Hence the valve 106 will be balanced and will not react to pressure variations from the source as applied to the valve 106 itself. Valve stem 110 at its upper end is connected to a modulating diaphragm assembly 123 which has one side in communication with chamber 120 and its opposite side in communication with a chamber 124 which is in communication with the pilot modulating valve 24 via passageway 40. The communication of outlet pressure from chamber 102 to chamber 120 via passage 122, as it acts upon the diaphragm assembly 123, results in regulation of gas flow through the valve 14.

A counter coil spring 126 is biased against the head 108 to normally maintain the valve 106 closed. The pressure variations as transmitted from the pilot modulating valve 24 to passage 40 will vary the pressure in the chamber 124 and hence will act upon diaphragm assembly 122 causing it to move the valve 106 against the bias of spring 126 to vary the magnitude of the opening 113. The chamber 124 is in communication with the outlet chamber 102 via a restricted bleed passageway 128 which permits flow thereby permitting rapid changes in pressure in chamber 124 and avoiding a trapped fluid condition.

Note that the vacuum condition (previously discussed) which spring 82 counteracts in valve 24 is caused by vacuum in chamber 80 as communicated by conduits and chambers 32, 102, 128, 124, and 40.

With the apparatus shown and described a substantial amount of gas flow can be controlled by the main modulating valve 14 through the action of the pilot valve 24. If the main modulating valve 14 were constructed to be made self-modulating, i.e., without the pilot modulating valve 24, a large and expensive solenoid would have to be used. As noted, in prior constructions, because of the large flow of gas to be handled and the forces required to actuate the valve, solenoids were not used but rather motor-actuated valve units have been utilized. These however are slow in response and have a tendency to overshoot and hunt. By modulating the valve 14 by use of the smaller pilot modulating valve 24 smaller electrical components, i.e., solenoid 84, can be used. In addition, the combination of a pilot modulating valve 24 and the main modulating valve 14 provide for a system which has a rapid response and in which hunting is minimized.

The control circuit 18 can comprise portions of the control circuit of the type as shown in the copending application to Charles Stang, Jr. et al., Ser. No. 697,863, filed Jan. 15, 1968, and the details of that application are incorporated herein by reference. With such a circuit and with the construction as shown in the drawings and described, the apparatus could be utilized to operate in conjunction with a thermostat located in the building to be heated. FIG. 6 shows such a circuit arrangement and includes the thermistor R1 as a part of a voltage-dividing network including a selectively variable calibrating resistor R2 and a temperature select resistor R3. For normal operation the temperature to which the incoming air would be heated would be selected by manipulation of R3. In the combined system for use with the conventional thermostat, the thermostat would have contacts K1 connected across R3 (or at least across a part of R3). UPon the room temperature reaching a magnitude actuating the conventional thermostat, contacts K1 would be closed shorting out resistor R3 thereby simulating selection of maximum temperature for the incoming makeup air. When contacts K1 open, the system reverts to its conventional mode of operation. Note that heat will be provided to the building by means of the makeup air system as well as through the conventional heating system. Modulation of heat to the makeup air will still occur since the thermistor R1 will still be active and will provide a signal to the modulating valve proportional to the difference between the selected temperature (i.e., R3 shorted) and the outside temperature.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. A makeup air heating system for a building including a burner having an inlet and an outlet operable from a source of gas to heat air passing from said inlet to said outlet, means providing air from the atmosphere outside said building to said burner inlet and means for providing heated air from said burner outlet to said building comprising: means responsive to the temperature of said air provided to said burner inlet including valve means for preventing delivery of said gas from said source to said burner when the temperature of said air provided to said burner is above a predetermined temperature, a main modulating valve controllably operable for controlling the flow of main gas from the source to said burner, said main modulating valve comprising control means operable in response to variations in control gas pressure for controlling the flow of main gas to the burner, a pilot modulating valve connected to said control means for varying the magnitude of said control gas pressure in response to variations in magnitude of an electrical signal, means sensing the temperature of the air from said burner outlet, and electrical control means for providing said electrical signal in accordance with variations in temperature of the air from said burner outlet as sensed by said sensing means whereby said flow of gas to said burner is highly responsive to the temperature of the air heated by said burner.

2. The apparatus of claim 1 further comprising manual valve means connected from said pilot regulating means to the burner for providing the low fire condition for the burner, said manual valve means being selectively adjustable for varying the gas flow to the burner.

3. The apparatus of claim 1 with said main modulating valve comprising main regulating means for regulating the flow of gas through control main modulating valve.

4. The apparatus of claim 1 with said pilot modulating valve including a solenoid electrically connected to said electrical control means for receiving said electrical signal.

5. The apparatus of claim 1 with said main modulating valve comprising a main inlet and outlet, a main poppet valve located between said main inlet and outlet, and a main diaphragm assembly for actuating said main poppet valve in response to said control gas pressure.

6. The apparatus of claim 1 with said pilot modulating valve comprising a pilot inlet and outlet, a pilot poppet valve located between said pilot inlet and outlet, and a solenoid electrically connected to said electrical control means for receiving said electrical signal and operative on said pilot poppet valve for varying the magnitude of the opening between said pilot inlet and outlet in accordance with variations in magnitude of said electrical signal.

7. The apparatus of claim 6 with said pilot poppet valve being unbalanced.

8. The apparatus of claim 6 with said pilot modulating valve including a spring for normally maintaining said pilot poppet valve closed and for holding said pilot poppet valve closed and for holding said pilot poppet valve closed under a low fire condition to the burner and high air velocity over the burner which can result in a substantial reduction in pressure at said pilot inlet.

9. The apparatus of claim 1 with said pilot regulating means comprising a regulating valve having a regulating inlet and outlet, a regulating poppet valve connected between said regulating inlet and outlet, and a regulating diaphragm assembly connected to said regulating poppet valve for regulating the gas pressure between said regulating inlet and outlet.

10. The apparatus of claim 9 for use in a makeup air heating system and further comprising a manual valve having a manual inlet connected to said regulating inlet and a manual outlet connected to the burner, said manual valve having a valve member manually adjustable to selected positions for varying the low fire condition to the burner.

11. The apparatus of claim 10 with said main modulating valve comprising main regulating means for regulating the flow of gas through said main modulating valve.

12. The apparatus of claim 10 with said pilot modulating valve comprising a pilot inlet connected to said regulating inlet and a pilot outlet connected to said main modulating valve, a pilot poppet valve located between said pilot inlet and outlet, and a solenoid electrically connected to said electrical control means for receiving said electrical signal and operative on said pilot poppet valve for varying the magnitude of the opening between said pilot inlet and outlet in accordance with variations in magnitude of said electrical signal.

13. The apparatus of claim 12 with said main modulating valve having a main inlet connection to the source of gas and a main outlet connected to the burner, a main poppet valve located between said main inlet and outlet, and a main diaphragm assembly having a control inlet connected to said pilot outlet and connected to said main poppet valve for actuating said main poppet valve to vary the opening between said main inlet and outlet and hence for varying the flow of main gas in accordance with variations in magnitude of said control gas pressure.

14. The apparatus of claim 13 with said main modulating valve having balancing means for balancing the gas pressure acting directly on said main poppet valve.

15. The apparatus of claim 14 with said pilot poppet valve being unbalanced.

16. The apparatus of claim is with said pilot modulating valve including a spring for normally maintaining said pilot poppet valve closed and for holding said pilot poppet valve closed and for holding said pilot poppet valve closed under a low fire condition to the burner and high air velocity over the burner which can result in a substantial reduction in pressure at said pilot inlet.

17. The makeup air heating system of claim 1 with said electrical control means comprising a first variable resistance member for varying its resistance in accordance with variations in temperature and located in a position to sense the makeup air temperature after it is heated, and a second variable resistance member selectively variable for selecting the temperature to which the makeup air is heated.

18. The makeup air heating system of claim 1 which has electrical control means comprising: a variable impedance member for varying its impedance in accordance with variations in temperature and located at a position to sense makeup air temperature after it is heated.

19. The makeup air heating system of claim 1 further comprising pilot regulating means operable with said pilot modulating valve for regulating said control gas pressure.

20. The makeup air heating system of claim 19 with said main modulating valve comprising a main inlet and outlet, a main poppet valve located between said main inlet and outlet, a main diaphragm assembly for actuating said main poppet valve in response to said control gas pressure having one side in communication with said pilot modulating valve, and a bleed passageway communicating with one side of said main diaphragm assembly with said main outlet.

21. The makeup air heating system of claim 20 with said main modulating valve having balancing means for balancing the gas pressure acting directly on said main poppet valve.